(12) United States Patent
Yonge, III et al.

(10) Patent No.: US 8,498,579 B2
(45) Date of Patent: Jul. 30, 2013

(54) CHANNEL REUSE IN COMMUNICATION SYSTEMS

(75) Inventors: Lawrence Winston Yonge, III, Summerfield, FL (US); Srinivas Katar, Gainesville, FL (US); Manjunath Anandarama Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 12/505,773

(22) Filed: Jul. 20, 2009

(65) Prior Publication Data

US 2011/0014910 A1 Jan. 20, 2011

(51) Int. Cl.
*H04B 17/00* (2006.01)
*H04L 12/26* (2006.01)

(52) U.S. Cl.
USPC ............ 455/67.11; 455/226.2; 455/522; 455/447; 370/230; 370/235; 370/445

(58) Field of Classification Search
USPC ............ 455/226.1, 226.2, 434, 501, 502, 455/522, 227, 230, 254, 256, 67.11; 370/445, 370/447, 448, 230, 235, 332
See application file for complete search history.

(56) References Cited

U.S. PATENT DOCUMENTS

| | | | |
|---|---|---|---|
| 4,025,853 A | 5/1977 | Addeo | |
| 4,670,906 A * | 6/1987 | Thro | 455/525 |
| 4,809,257 A * | 2/1989 | Gantenbein et al. | 398/128 |
| 5,003,619 A | 3/1991 | Morris et al. | |
| 5,566,165 A | 10/1996 | Sawahasi et al. | |
| 5,623,486 A | 4/1997 | Dohi et al. | |
| 5,768,684 A | 6/1998 | Grubb et al. | |
| 5,787,352 A | 7/1998 | Benveniste | |
| 5,987,333 A | 11/1999 | Sole | |
| 6,131,031 A | 10/2000 | Lober et al. | |
| 6,157,616 A * | 12/2000 | Whitehead | 370/252 |
| 6,163,696 A * | 12/2000 | Bi et al. | 455/436 |
| 6,546,254 B2 * | 4/2003 | Fitzgerald | 455/447 |
| 6,643,272 B1 | 11/2003 | Moon et al. | |
| 6,985,456 B2 * | 1/2006 | Gaskill et al. | 370/318 |
| 7,076,274 B2 * | 7/2006 | Jollota et al. | 455/561 |
| 7,200,374 B1 * | 4/2007 | Stephens | 455/254 |
| 7,209,467 B2 * | 4/2007 | Liu et al. | 370/338 |

(Continued)

FOREIGN PATENT DOCUMENTS

WO 2005119478 A1 12/2005

OTHER PUBLICATIONS

Kim, Tae-Suk et al., "Improving Spatial Reuse through Tuning Transmit Power, Carrier Sense Threshold, and Data Rate in Multi-hop Wireless Networks." Power point presentation, ACM MobiCom 2006, 24 pages.

(Continued)

*Primary Examiner* — Duc M Nguyen
(74) *Attorney, Agent, or Firm* — DeLizio Gilliam, PLLC (57) ABSTRACT

Disclosed are systems and methods for communicating among stations coupled to a communication medium by receiving signals from a plurality of the stations, determining signal strength values for each of the received signals based on at least a portion of the signal, and based on the signal strength values, selecting a detection threshold such that, in response to a signal having a signal strength in excess of the detection threshold, the signal is processed according to a protocol of a subset of the stations.

29 Claims, 5 Drawing Sheets

U.S. PATENT DOCUMENTS

| | | | |
|---|---|---|---|
| 7,286,474 B2* | 10/2007 | Garg et al. | 370/230 |
| 7,639,726 B1* | 12/2009 | Sinsuan et al. | 375/130 |
| 2002/0010870 A1 | 1/2002 | Gardner | |
| 2002/0065094 A1 | 5/2002 | Schmutz et al. | |
| 2002/0105925 A1 | 8/2002 | Shoemake | |
| 2002/0123357 A1 | 9/2002 | Abrishamkar et al. | |
| 2003/0184433 A1 | 10/2003 | Zalitzky et al. | |
| 2003/0193907 A1 | 10/2003 | Rezaiifar et al. | |
| 2003/0199283 A1* | 10/2003 | Busch | 455/513 |
| 2005/0169222 A1 | 8/2005 | Ayyagari et al. | |
| 2005/0220230 A1* | 10/2005 | Fukuda | 375/343 |
| 2006/0221999 A1* | 10/2006 | Bachrach et al. | 370/465 |
| 2006/0262721 A1* | 11/2006 | Radunovic et al. | 370/229 |
| 2009/0116461 A1 | 5/2009 | Yonge, III | |
| 2010/0075704 A1* | 3/2010 | McHenry et al. | 455/509 |
| 2011/0034166 A1 | 2/2011 | Karabinis et al. | |

OTHER PUBLICATIONS

Yang, Xue et al., "On the Physical Carrier Sense in Wireless Ad Hoc Networks." Technical Report, 2004. Univeristy of Illinois at Urbana-Champaign, pp. 1-13.

"PCT Application No. PCT/US2012/071852 International Search Report", Mar. 25, 2013, 15 pages.

* cited by examiner

FIG. 1

POWERLINE COMMUNICATION
NETWORK CONFIGURATION

CHANNEL REUSE IN COMMUNICATION SYSTEMS

BACKGROUND

This description relates to channel reuse in communication systems.

Communications systems, such as, cellular communication systems, power line communication systems, and wireless local area network systems use electromagnetic signals to exchange information. Electromagnetic signals get attenuated and distorted as they propagate through media. In general, signal attenuation increases as the distance between a receiver and a transmitter increases. Signal distortion depends on the medium through which the signal propagates. In addition to getting attenuated and distorted, signals also get corrupted due to noise in the medium. Accordingly, in communication systems, a signal can only be properly received if the signal-to-noise ratio at the receiving station is high enough. The signal-to-noise ratio thus limits the range of separation between the transmitter and receiver for successfully communication. For example, the range of electromagnetic signals in cellular networks is several miles while the range of signals in a WiFi system is a few hundred feet.

SUMMARY

In one aspect, in general, a method of communicating among stations coupled to a communication medium includes: receiving signals from a plurality of the stations, determining signal strength values for each of the received signals based on at least a portion of the signal, and based on the signal strength values, selecting a detection threshold such that, in response to a signal having a signal strength in excess of the detection threshold, the signal is processed according to a protocol of a subset of the stations.

Aspects can include one or more of the following features.

Determining a signal strength value for a given signal comprises detecting a preamble of the given signal.

Selecting the detection threshold comprises analyzing frame control portions of the received signals.

Determining the signal strength value for the given signal comprises determining the signal strength value based on at least a portion of the detected preamble.

The detection threshold is selected based on a signal strength value of a selected one of the received signals having a minimum signal strength value.

The method further comprises, if a signal strength value of a signal received after selecting the detection threshold is lower than the detection threshold, excluding the signal from further processing and proceeding with a contention process among the subset of stations.

The method further comprises, if a signal strength value of a signal received after selecting the detection threshold is in excess of the detection threshold, suspending a contention process among the subset of stations.

The method further comprises, for each station coupled to the communication medium, maintaining signal strength information.

The signal strength information is maintained at each of the stations coupled to the communication medium.

Determining a signal strength value for a given signal includes determining an automatic gain control setting used for detecting the given signal.

Determining a signal strength value for a given signal includes determining at least one of a correlation between different portions of the given signal and a correlation between a portion of the given signal and a stored symbol.

The method further comprises, for each of the received signals, identifying a frame control portion of the signal, and using the frame control portion to determine whether a signal is excluded from a contention process among the subset of stations.

The method further comprises storing at each station coupled to the communication medium information from signals received at a given station and not addressed to the given station.

The stored information includes at least one of a source address, network identification information, and information used to demodulate a payload.

The method further comprises, in response to detecting that the received signals are from stations that belong to different networks, selecting the detection threshold such that, in response to the received signals having a signal strength in excess of the detection threshold, the received signals are processed according to the protocol of a subset of the stations.

The method further comprises selecting the detection threshold based on information in the signals regarding the destination stations to which the signals are addressed.

The subset of the stations includes an authorized network of stations.

The signals from networks other than the authorized network are rejected.

In another aspect, in general, a method of communicating among stations coupled to a communication medium includes sending a pending transmission from a first station in a first network to a first destination station based on whether a second destination station of an ongoing transmission is affected by the pending transmission.

Aspects can include on or more of the following features.

Sending the pending transmission from the first station to the first destination station is also based on whether the first destination station of the pending transmission is affected by the ongoing transmission.

The ongoing transmission includes a transmission from a second station within a second network to a second destination station.

The method further comprises sending the pending transmission from the first station to the first destination station if the second destination station of the ongoing transmission is not affected by the pending transmission.

The method further comprises sending the pending transmission from the first station to the first destination station if the first destination station of the pending transmission is not affected by the ongoing transmission.

The method further comprises updating transmission mechanism parameters based on at least one of whether the first destination station is affected by the ongoing transmission, and whether the second destination station is affected by the pending transmission.

The method further comprises determining whether the second destination station of the ongoing transmission will be affected by the pending transmission based on signal information stored at the first station.

The method further comprises determining whether the first destination station of the pending transmission will be affected by the ongoing transmission based on signal information stored at the first station.

The signal information includes a table having, for each signal transmitted by the stations, at least one of source address, network ID, and preamble information.

The method further comprises exchanging the signal information stored at the first station with other stations coupled to the communication medium.

In another aspect, in general, a communication system includes: a communication medium; and multiple stations coupled to the communication medium. Each station is configured to receive signals from a plurality of the stations, determine signal strength values for each of the received signals based on at least a portion of the signal, and based on the signal strength values, select a detection threshold such that, in response to a signal having a signal strength in excess of the detection threshold, the signal is processed according to a protocol of a subset of the stations.

Among the many advantages of the invention (some of which may be achieved only in some of its various aspects and implementations) are the following.

By ignoring signals whose preamble signal strength is below a predetermined detection threshold, reuse of a communication medium can be improved in some cases. For example, a signal encoding a frame may be strong enough for its preamble and frame control information to be detected, but weak enough for its following data payload to not interfere with other transmissions. Additionally, other information, including information within the frame control, can be combined with signal strength information to make decisions about which signals to ignore and about when signals those signals should be ignored.

In some communication systems, a carrier sense mechanism measures signal strength on a medium to determine that there is an ongoing transmission and a new transmission should not be initiated. However, in a medium in which there may be spikes of noise, a large measured signal strength may not indicate the presence of an ongoing transmission. By measuring signal strength during detection of a preamble, the system can ensure that the signal is not merely noise. For example, an AGC freeze value and/or SYNC detection threshold value, described in more detail below, can be used to ensure that a signal strength is being measured during detection of a preamble.

Other features and advantages of the invention will become apparent from the following description, and from the claims.

DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Electromagnetic signals have a limited range of propagation over various types of communication media. The limited range can be used to facilitate simultaneous use, i.e., "reuse," of the medium by communication stations that are outside the range of each other. For example, a cellular system can use a frequency planning mechanism for enhancing simultaneous use of frequency channels. The cellular system is geographically divided into cells, each served by a fixed transmitter station, known as a base station. A group of cells form a cluster, each covering a predetermined geographical area. The size of the cluster depends on the range of the electromagnetic signals. Each cell in the cluster uses a unique frequency band for transmissions. Cells at the same relative geographical location in each cluster reuse the same frequency band.

The techniques and systems described herein can be used in a variety of communication networks, include coaxial networks, phone line based networks and power line networks. The techniques and systems can also be used across different type of networks, and across multiple networks. For example, in a home unit where both a coaxial network and a power line based network are deployed, it is possible for communication signals from the power line network to leak in to the coaxial network or vice versa. Accordingly, the coaxial network and power line based network can use the techniques and systems described herein, for example, to enhance spatial reuse of channels within the respective networks.

In power line communication networks the communication medium is a power line that is also used for electric power transmission. For example, power line communication networks use existing electrical wiring and outlets in a home or small business to connect PCs, broadband modems, set-top boxes, gaming consoles, audio/video players, flat screen displays, security cameras and other electronics devices.

In some examples, power line communication networks can be patterned on a layered communication network model, such as, the seven-layer open systems interconnection (OSI) network model adopted by International Telecommunication Union (ITU) as a standard. The seven layers include a physical layer (PHY), data link layer, network layer, transport layer, session layer, presentation layer, and application layer. The PHY is fundamental layer that concerns the physical implementation of the communication network. The physical layer interfaces with the data link layer to encapsulate communication data for transmission over the power line medium. The data link layer includes a media access control (MAC) sublayer for providing addressing and channel access control mechanisms to enable communication between the various stations in the power line communication network. The PHY organizes communication data from the higher levels into bit stream data units known as PHY protocol data units (PPDU) for transmission over the power line medium.

Figure 1:
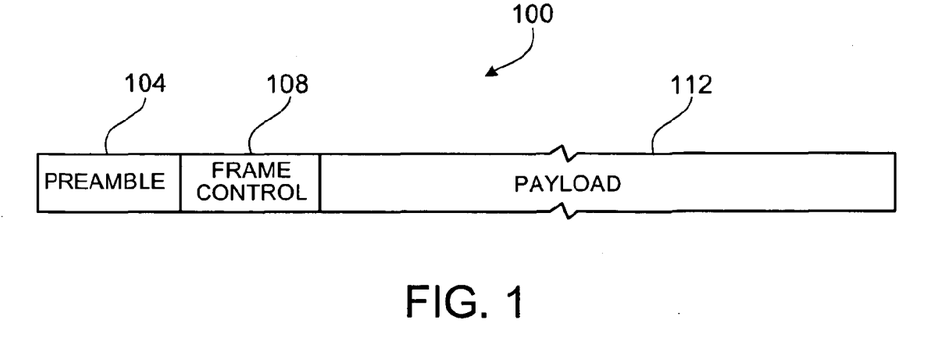
FIG. 1 is a schematic of an example PHY protocol data unit of a communication signal.

Referring to FIG. 1, an example format of a PPDU 100 includes a preamble 104, a frame control portion 108 and payload 112. In some implementations, the preamble 104 includes a predetermined pattern that is used to demarcate the start of the PPDU 100. For example, the preamble 104 can be a repeating pattern of symbols. In some implementations, the symbols are Orthogonal Frequency Division Multiplexing symbols where each symbol includes a number of orthogonal sinusoidal carrier waveforms over the same symbol length, where each waveform includes an integral number of cycles over the symbol length, as described in more detail in U.S. Publication No. U.S. 2006/0256883 (A1), incorporated herein by reference.

Figure 2:
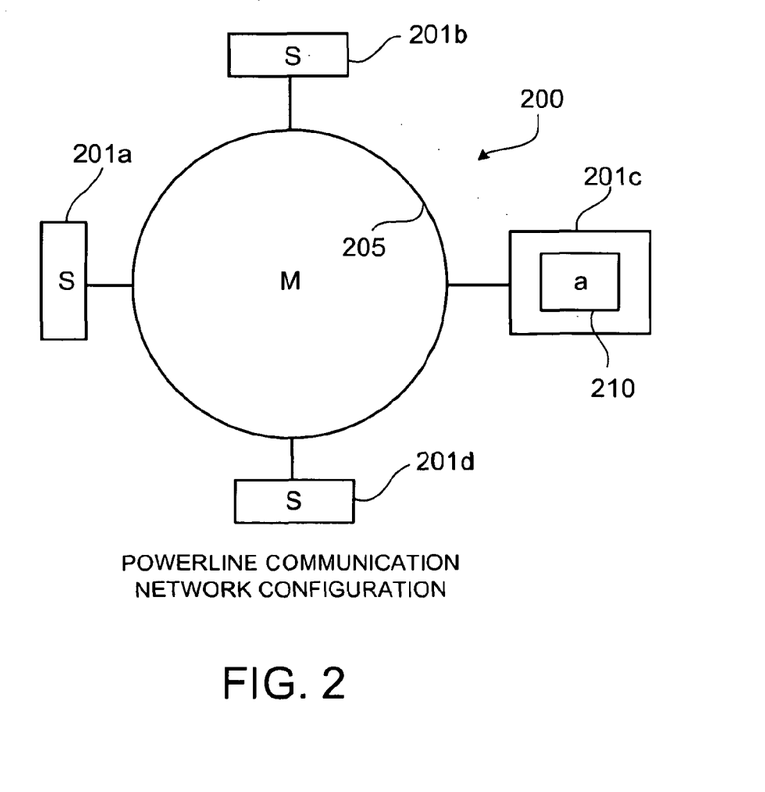
FIG. 2 is an example power line communication network configuration.

FIG. 2 is a schematic of an example power line communication network 200 having a plurality of stations 201a-d (generally 201). The stations 201 are each configured to transmit and receive data over the power line medium 205. The stations 201 may be referred to as a transmitter or receiver station with respect to a given transmission depending on whether the station 201 is transmitting or receiving data. However, each station 201 can be configured to include both transmitter circuitry and receiver circuitry, and in some implementations, transceiver circuitry is shared by both transmitter and receiver functionality.

In some examples, a station detects a received signal based on recognition of a preamble that includes a predetermined sequence of symbols. In order to detect the sequence of signals, the station is typically configured to use a predetermined detection threshold to ensure that signals that meet the criteria imposed by the detection threshold are detected, while signals that do not meet the criteria can be discarded. The detection threshold can be used in combination with other criteria to determine whether a signal will continue to be processed or will be discarded. In some implementations, a station determines whether detection criteria are met based on at least an initial portion of the preamble, and in some implementations, a station determines whether detection criteria are met based on detecting and analyzing information in the received signal. The station 201 then establishes the detection threshold based on signal strength information and optionally other information, as described in more detail below. Accordingly, in some examples, the signal strength information for a received signal can include detected signal values for the received signals and/or other information indicative of signal robustness.

In some implementations, a receiver amplifier 210 having gain, G, is used in a station 201 to regulate a received signal to achieve a satisfactory signal-to-noise ratio. The station 201 can use the preamble 104 of the PPDU 100 to adjust the gain of a receiver amplifier 210 at the station. A process known as automatic gain control (AGC) can be used by the station 201 to adjust the gain of the receiver amplifier 210. AGC enables the station 201 to minimize noise levels in a received communication signal and regulate the signal's strength such that an appropriate signal-to-noise ratio is achieved. Once the appropriate AGC setting for receiving the signal is determined, the station 201 freezes (or locks) the gain of the receiver amplifier 210 for the remainder of the PPDU 100. The locked gain setting of the receiver amplifier 210 for receiving the PPDU 100 is called "AGC freeze value." In some examples, the AGC freeze value can be a good indicator of the signal strength of the signal received at the station 201. For example, a high AGC freeze value can indicate low received signal strength. Alternatively, other techniques can be used to determine the signal strength of a received signal. For example, the signal energy within the preamble can be measured to provide a value that is compared to a detection threshold.

Figure 3:
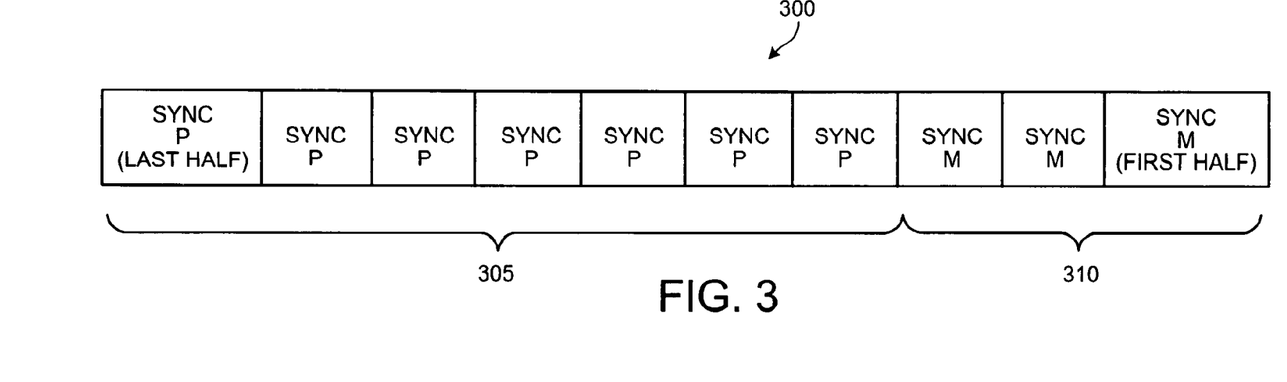
FIG. 3 is a schematic of an example preamble pattern.

FIG. 3 illustrates an example preamble pattern 300 that can used by power line communication systems for the preamble 104 of PPDU 100. As shown, the preamble pattern 300 consists of 7.5 SYNCP symbols 305 followed by 2.5 SYNCM symbols 310. The SYNCM symbols 310 are generated by shifting the phases of the respective carrier waveforms that make up the SYNCP symbols 305 by 180 degrees. The preamble pattern 300 can be used by a station to determine the start of the PPDU 100 in a received signal. In some examples, the preamble 104 is detected by a symbol correlation module (not shown) in the receiver station that performs the following two symbol correlation tests for initial preamble signal detection (e.g., for carrier sense, and/or determining a detection threshold).

For the first symbol correlation test, the symbol correlation module correlates different portions of a received communication signal that are separated by one SYNCP symbol length to determine if adjacent symbols in the received signal match each other. Since a preamble pattern 300 consists of several SYNCP signals 305, a high degree of correlation is expected between these portions of adjacent symbols when a preamble pattern 300 is present in the signal. Further, since SYNCM symbols 310 are generated by shifting the SYNCP signals 305 by 180 degrees, a large negative correlation is also expected using this first test for the SYNCP symbol 305 to SYNCM symbol 310 transition of the preamble 300. Accordingly, a transition in large positive correlation to large negative correlation can be used by the station to determine the timing of the preamble 300.

For the second symbol correlation test, the symbol correlation module correlates symbols in a received communication signal with a stored SYNCP symbol 305 pattern to determine if a symbol in the received signal matches the stored SYNCP symbol 305. Since the preamble pattern 300 includes SYNCP symbols 305 identical to the stored SYNCP symbol 305, a high degree of correlation is also expected for this second test. Further, a high degree of negative auto correlation is expected when a SYNCM symbol 310 is detected in the signal. Accordingly, a degree of the correlation obtained from these correlation tests can be used to determine whether a preamble pattern 300 is detected in the received signal.

The degree of correlation for either of these correlation tests necessary to establish presence of a preamble pattern 300 in a signal is called "SYNC detection threshold." A high value of the SYNC detection threshold suggests that a high degree of correlation for a given correlation test is needed to establish the presence of the preamble pattern 300 in the signal. If both correlation tests yield correlation values higher than their respective thresholds, then the preamble 300 is considered to be detected for the purposes of determining the received signal strength (e.g., using the AGC freeze value). Alternatively, in some implementations, the receiver can wait until after the negative correlation corresponding to the SYNCP to SYNCM symbol transition is detected to determine the received signal strength. In some implementations, a receiver station can suppress the detection of the preamble pattern 300 of a communication signal from a distant transmitter station (i.e., a weak signal) by increasing its SYNC detection threshold for one or both of the correlation tests.

In some examples, the frame control portion 108 of a PPDU 100 (FIG. 1) includes MAC and PHY related control information such as, the source and destination address of the PPDU 100, the network to which the source of the PPDU 100 (e.g., the transmitter station of FIG. 2) belongs, information necessary to demodulate the PPDU payload (e.g., modulation, code rate information), information regarding length of the PPDU 100, and channel access information.

In some examples, the payload 112 includes application level data and/or management messages. In some examples, the payload 112 may not be present in a PPDU 100 that only carry control information in, for example, the frame control portion 108 of the PPDU 100.

Power lines were originally designed for transmission of power at 50-60 Hz in many cases, and up to 400 Hz in some cases. Accordingly, power line media can present an electrically contaminated environment for communication signals. For this reason, in some examples, to ensure proper functioning of the power line communication system and reception of the payload 112, the preamble 104 and frame control portion 108 of the PPDU 100 are designed to be extremely robust.

However, because of the robustness of the preamble 104 and frame control portion 108 of a PPDU 100, in some examples, stations 201 in one networks may detect signals from stations 201 in another network, thus affecting channel reuse. For example, a first receiver station in a home of a multi-dwelling unit can, in some instances, detect preambles 104 and frame control portions 108 of signals intended to be received by a second receiver station in another home of the multi-dwelling unit. Similarly, the second receiver station may detect preambles 104 and frame control portions 108 of signals intended to be received by the first receiver station. In some implementations, such detection of preambles 104 and frame control portions 108 of signals destined for other stations can be used to determine which signals can be ignored even if they are robust enough to be detected, to increase sharing of the power line medium.

Referring again to FIG. 2, in some examples, a station can use signal strength values corresponding to received signals to determine a detection threshold value for the station 201. The detection threshold value can be used to determine which of a plurality of received signals to accept, for example, for use in a contention based procedure (e.g., a CSMA/CA system) at the receiver station 205, and which of the plurality of received signals to ignore. The detection threshold can be a value that is compared to a measured signal strength of a received signal after the preamble of that received signal has been successfully detected. Alternatively, the detection threshold can correspond to one or both of the SYNC detection thresholds, in which case, the received signal is ignored without being successfully detected.

Figure 4:
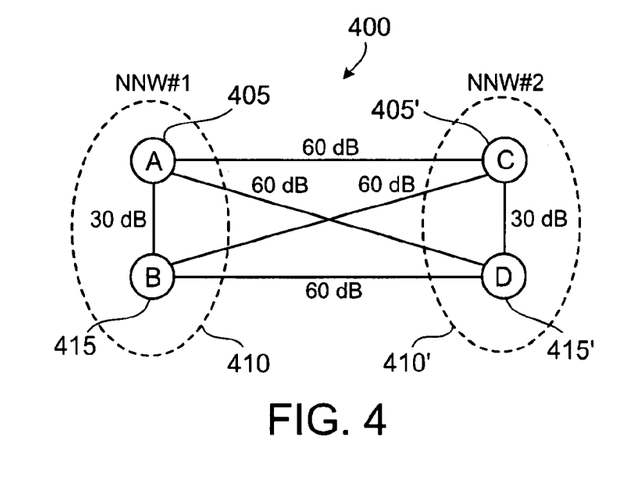
FIGS. 4-7 are example scenarios of neighbor networks.

For example, referring now to FIG. 4, in scenario 400, stations 405 and 405' in a first neighbor network 410 and a second neighbor network 410', respectively, are separated by at least 60 dB of signal strength attenuation, while stations 405 and 415 in the first neighbor network 410 and stations 405' and 415' in second neighbor network 410' are separated by 30 dB of signal strength attenuation. Although only two neighbor networks 410 and 410' are shown, it should be understood that the techniques and systems in this description can be used for any number of neighbor networks 410, 410'.

Assuming the noise level at each station is low, all stations in the first neighbor network 410 and the second neighbor network 410' can detect each other because to the robustness of the preambles 104 and frame control portions 108 of the signals. Accordingly, the first neighbor network 410 and the second neighbor network 410' share the medium.

However, since the signal strength levels of signals from e.g., the second neighbor network 410' are at least 30 dB below the signal strength levels of signals from within e.g., the first neighbor network 410, it is possible for the first neighbor network 410 and the second neighbor network 410' to operate independent of each other by using signal strength information, effectively doubling the capacity of each network's medium. For example, as described in detail below, signal strength information from the preambles 104 of the received signals can be used to exclude signals that are attenuated below a predetermined threshold value. In some examples, the signal strength information can be based on receiver stations' AGC freeze values, SYNCP symbol correlation values (e.g., either or both of the two correlation tests described above), and/or based on other information that can be obtained from processing the preambles 104 of the received signals.

In some examples, the attenuation of signal strength between stations in a power line communication system depends on power line topology. Accordingly, it is possible that signal strength attenuation between stations in neighbor networks 410, 410' may not be large enough to allow full reuse of the power line medium.

Figure 5:
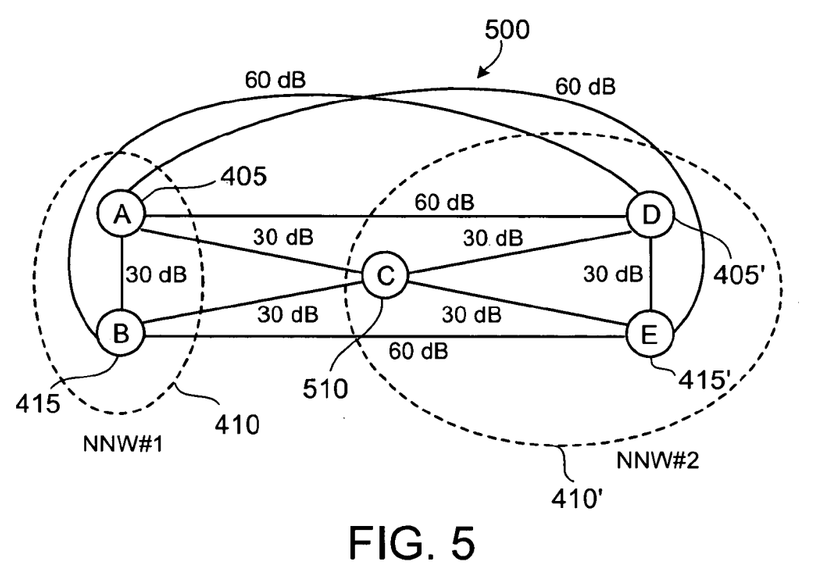

For example, referring to FIG. 5, in a scenario 500, the signal strength attenuation between station 510 in the second neighbor network 410' and stations 405 and 415 in the first neighbor network 410 is 30 dB, while the signal strength attenuation between stations 405' and 415' in the second neighbor network 410' and stations 405 and 415 in the first neighbor network 410 is 60 dB.

As described below, at one or more stations in the first neighbor network 410 and the second neighbor network 410', signal strength information derived from the received signals may be used to enhance channel reuse. For example, when there is an ongoing transmission between stations 405 and 415, transmissions may be permitted between stations 405' and 415'. However, in some examples, transmissions between stations 405 and 415 may not be permitted to occur when there is ongoing transmissions between stations 405' and 510 as well as transmissions between stations 415' and 510 because the transmissions between stations 405 and 415 may interfere with the ongoing transmissions between stations 405' and 510 as well as transmissions between stations 415' and 510.

Figure 6:
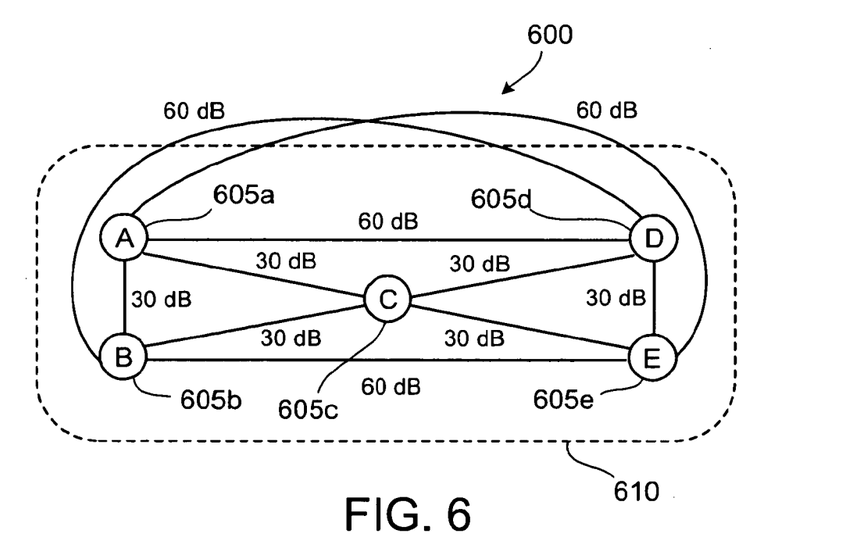

In some examples, the robustness of the preambles 104 and frame control portions 108 can also affect channel use within a single network. Referring to FIG. 6, in an example scenario 600, five stations 605a-e belong to a single network 610. In this scenario 600, stations 605a and 605b are each separated from stations 605d and 605e, respectively, by at least 60 dB of signal strength attenuation. Station 605a and station 605b, station 605d and station 605e, and station 605c and each of stations 605a, 605b, 605d, and 605e, are separated by 30 dB of signal strength attenuation. Assuming that the noise level at each station 605a-e is low, the stations 605a-e can each detect ongoing transmissions between each pair of stations 605a-e because of the robustness of the preambles 104 and frame control portions 108. This can result in sharing of the medium between all stations 605a-e. However, since each of stations 605a and 605b are separated by at least 60 dB from stations 605d and 605e, respectively, using the techniques described below, transmissions between stations 605a and 605b can be carried out while transmissions between station 605d and 605e are being carried out, thus improving overall capacity of the medium.

In each of the example scenarios 400 (FIG. 4), 500 (FIG. 5), and 600 (FIG. 6) described above, the stations use signal strength information derived from the received signals to determine which transmissions to accept and which transmissions to reject (ignore). Signal strength information can be derived from the received signals in a variety of ways. In some examples, a station 605 derives signal strength information from the preamble 104 of a received signal. The signal strength information from the preamble 605 can be based on AGC freeze value, correlation values, and/or other information derived from processing the preamble 104.

Referring again to FIG. 6, in some examples, a station 605 in the network 610 can monitor the signal-strength information for all signals received from other stations 605 in the network 610. Using this signal-strength information, the station 605 can determine the signal strength of the weakest signal received from within the network 610. In some examples, the station 605 selects a detection threshold based on the weakest signal detected in the network 610. For example, the station 605 can set the detection threshold to be equal to a signal strength value corresponding to the weakest signal in the network 610 less a predetermined offset. Transmissions that have a signal strength value below the detection threshold can be ignored by the station 605. In some implementations, the station 605 can participate in simultaneous transmissions by reusing the medium while other transmissions that are below the detection threshold are ongoing. The predetermined offset that is applied to the weakest signal received from within the network 610 enables the station to continue detection of transmissions from other stations 605 within the network 610 even when changes in channel characteristics cause reductions in signal strength levels (i.e., degradation of signal strengths).

In some examples, referring to FIG. 4, the first neighbor network 410 and the second neighbor network 410' can be isolated from each other by having the stations set their detection threshold(s) to at least 20 dB below the signal strength level of the weakest signal (i.e., 30 dB of attenuated signal strength level) within each of the first neighbor network 410 and the second neighbor network 410'.

In some examples, each station 405, 415 in the first neighbor network 410 can collect signal strength level information for transmissions from various stations 405, 415 within the first neighbor network 410 and from stations 405', 415' within the second neighbor network 410', and process the signal strength information from all stations 405, 405' to determine the detection threshold at each of the other stations 405, 405'. In some examples, the signal strength level information may be processed at either a designated station in a network 410, e.g., a "master" station (not shown), or across multiple stations 405 by distributing the processing task in parallel or in serial among the stations 405.

In some examples, the stations 405, 405' in the first neighbor network 410 and second neighbor network 410' can be preconfigured with at least two detection thresholds values e.g., threshold_1, and threshold_2. In some implementations, threshold_1 can be used when no neighbor networks 410, 410' are detected, and threshold_2 can be used when at least one neighbor network 410, 410' is detected. In some implementations, threshold_1 can be used to detect and process signals from one neighbor network, e.g., network 410', and threshold_2 can be used to detect and process signals from another neighbor network (not shown). In some implementations, threshold_2 can be selected to provide isolation from neighbor networks 410' within a region where the stations 405 are installed, while maintaining communication between stations 405 belonging to the same network 410.

Referring again to FIG. 6, in some examples, to enhance spatial reuse of channels within a single network 610, the stations 605 in the network 610 can process the preambles 104 of received signals for signal strength information. Each station 605 in the network 610 can use the signal strength information for signals from various stations 605 in the network 610 to determine its local detection threshold. In some examples, the detection threshold at a station, e.g., station 605a, can prescribe a subset of stations, e.g., stations 605b-c, within the network 610 from which the station 605a, is willing to accept signals. Stations that are further away, e.g., stations 605d-e, can be ignored, although, in some examples, data exchange with the stations 605d-e and 605a can still be accomplished using one or more repeaters.

In some examples, the detection threshold(s) for stations 605 in a network 610 can be determined by designating a master station (not shown) to process signal strength information to provide the detection threshold(s). In some examples, when operating in a medium where channel characteristics are changing with time, the detection threshold value(s) can be updated either periodically or based on need.

In some examples, along with the preamble 104, the receiver station 605 can also use the frame control portion 108 to determine whether the station can simultaneously reuse the medium along with an ongoing transmission. Accordingly, in some examples, the techniques described above using the preamble 104 alone can be enhanced by using e.g., source address (SA) and/or network ID (NID) information in the frame control portion 108 to determine if a signal is from a station within the network 610. Using the signal strength information based on the preamble 104 and the frame control portion 108, a receiver station 605 can be configured to not ignore transmissions from stations 605 within the network but to ignore transmissions from stations in neighboring networks if their signal strength is below the signal strength indicated by the detection threshold(s).

Figure 7:
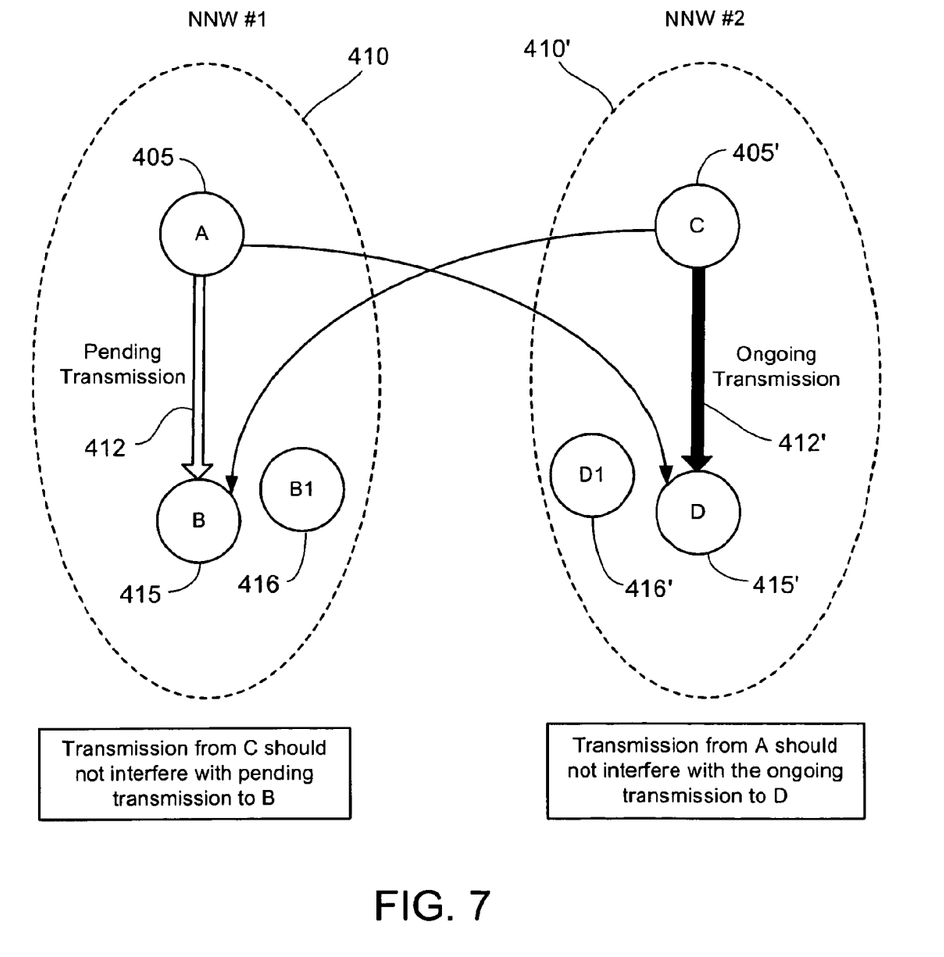

Referring to FIG. 7, in some examples, each station 405 in a network 410 can maintain a table of the source address (SA), network ID (NID) information, and signal strength information for every transmission the station 405 receives from stations 405 within and stations 405' outside the station's network 410. In some examples, the stations 405 can then exchange this table of information with other stations 405 within and stations 405' outside the network 410 using management messages. In some examples, a master station can transmit the table of information to each station with a network 410.

When a station 405 has a pending transmission 412 and detects an ongoing transmission 412', the station 405 can use the information contained in the table to determine if it should proceed with the pending transmission 412. The station 405 that has a pending transmission 412 uses the information contained in the table along with timing information indicating the status of an ongoing transmission between two other stations. In some examples, the timing information can be transmitted to the station 405 through management messages. For example, based on the information in the table and timing information indicating the status of an ongoing transmission 412', the station 405 can proceed with an intended pending transmission 412 provided the following two conditions are met: 1) the destination station 415' of the ongoing transmission 412' is not affected by the intended pending transmission 412 from the station 405 (i.e., the station 415' can properly receive the ongoing transmission 412'), and 2) the destination station 415 of the intended pending transmission 412 is not affected by the ongoing transmission 412' (i.e., the station 415 can properly receive the intended pending transmission 412).

In some examples, if a station 405 has data pending for multiple stations, e.g., stations 415, 416, the station 405 can transmit to those stations 415, 416 that satisfy condition two provided condition one is not broken. If both conditions are satisfied, the station 405 will proceed with the intended pending transmission 412. If both conditions are not satisfied, the station 405 will not proceed with the intended pending transmission 412.

Figure 8:
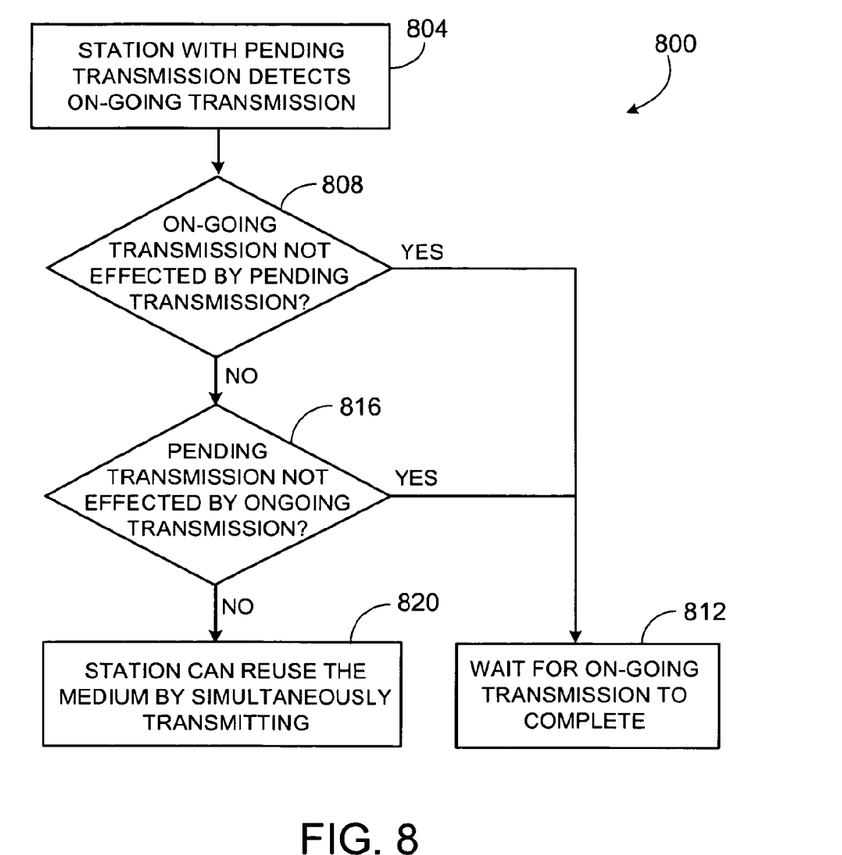
FIG. 8 is flowchart showing an example channel reuse process.

FIG. 8 is a flowchart for an example method 800 for enabling channel reuse. A station having a pending transmission detects an ongoing transmission. (Step 804) In some examples, the station having a pending transmission uses signal strength level information based on information in the transmissions' preambles 104 alone, or both preambles 104 and frame control portions 108, to determine whether an ongoing transmission is affected by the pending transmission. (Step 808) In some examples, the station having a pending transmission uses a table of the source address (SA), network ID (NID) information, and signal strength information for every transmission the station receives from stations within and outside the station's network to determine whether an ongoing transmission is affected by the pending transmission.

If it is determined that the ongoing transmission is deemed affected by the pending transmission, then the station having the pending transmission waits for the ongoing transmission to complete. (Step 812) If the ongoing transmission is deemed not affected by the pending transmission, then the station having the pending transmission checks whether the pending transmission is affected by the ongoing transmission. (Step 816) In some examples, the station having a pending transmission uses signal strength level information based on information in the transmissions' preambles 104 alone, or both preambles 104 and frame control portions 108, to determine whether the pending transmission is affected by the ongoing transmission. In some examples, the station having a pending transmission uses a table of the source address (SA), network ID (NID) information, and signal strength information for every transmission the station receives from stations within and outside the station's network to determine whether the pending transmission is affected by the ongoing transmission. If the pending transmission is deemed not affected by the ongoing transmission, the station can reuse the medium by simultaneously transmitting the pending transmission. (Step 820)

In some implementations, the method 800 can be deployed in, for example, scenario 500 (FIG. 5). For example, if station 405' has a pending transmission for stations 510 and 415', and detects an ongoing transmission from Station 405 to Station 415, then station 405' can use the SA, NID, and signal strength tables from the other stations to determine whether it can simultaneously reuse the medium by transmitting to, for example, station 415'.

In some implementations, further enhancements to spatial reuse within a single network can be obtained by using the SA, destination address (DA) and signal strength information within the frame control portion 108 of a transmission. For example, station can exchange tables containing SA, DA, signal strength with other stations in the network and use the information in the tables to determine if a pending transmission will interfere with an on-going transmission and if the pending transmission is affected by ongoing transmission.

Various techniques can be used to enhance performance of networks by determining conditions under which stations can simultaneously transmit and receive data. The methods and systems described herein can be used along with a variety of channel access mechanisms. For example, the techniques described in this description for reusing the channel can be used for CSMA traffic in a local network during TDMA allocations of neighboring networks and/or for TDMA traffic in a local network when the neighboring network has either TDMA allocations or CSMA traffic.

In a carrier sense multiple accesses with collision avoidance (CSMA/CA) system, stations that have data to transmit can use carrier sense to determine if there is an ongoing transmission. If an ongoing transmission is detected, the station can refrain from transmitting data until a current transmission is complete. When the current transmission is completed, the station transmits its data. In some examples, to avoid collisions between multiple stations that have data to send, a back-off mechanism can be used to spread the time at which various stations start transmission. This can reduce a chance that two stations start transmitting at the same time, thus reducing a probability of collision. In some examples, in networks operating using carrier sense multiple accesses with collision avoidance (CSMA/CA), if a station receives a signal having a preamble 104 and determines that the signal level of the preamble 104 is below the signal strength threshold required by the detection threshold, the station will ignore the signal and continue contending. However, if the received signal strength is above the signal strength required by the detection threshold, the station will consider the signal, stop contending and update its back-off parameters.

In a time division multiple access (TDMA) system, a station is provided with special time allocations when it can transmit data to one or more stations. Accordingly, the other stations can use the methods and systems described herein to determine if they can simultaneously transmit during this time allocation. For example, referring to FIG. 5, the TDMA allocations granted for transmissions from Station 405 to Station 415 can be reused for transmissions from Station 405' to Station 415'.

The techniques described above can be implemented using software for execution on computers located at the stations. For instance, the software forms procedures in one or more computer programs that execute on one or more programmed or programmable computer systems at a station (which may be of various architectures such as distributed, client/server, or grid) each including at least one processor, at least one data storage system (including volatile and non-volatile memory and/or storage elements), at least one input device or port, and at least one output device or port.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method of communicating among stations coupled to a shared communication medium, comprising:

receiving signals from a first plurality of the stations in a first network through the shared communication medium that is shared with a second plurality of the stations in a second network, determining signal strength values for each of the received signals from the first plurality of the stations in the first network based on at least a portion of a detected preamble of a received signal, wherein the detected preamble is received at a higher signal strength than a remaining portion of the received signal, receiving an indicator of signal strength values determined for received signals among the second plurality of the stations in the second network; and based on the signal strength values for each of the received signals from the first plurality of the stations in the first network and based on the indicator of the signal strength values determined for the received signals among the second plurality of the stations in the second network, selecting a detection threshold such that, in response to a signal having a signal strength in excess of the detection threshold, the signal is processed according to a protocol of the first plurality of the stations and is not processed according to a protocol of the second plurality of the stations.

2. The method of claim 1, in which selecting the detection threshold comprises analyzing frame control portions of the received signals.

3. The method of claim 1, in which the detection threshold is selected based on a signal strength value of a selected one of the received signals having a minimum signal strength value.

4. The method of claim 1, further comprising, if a signal strength value of a signal received after selecting the detection threshold is lower than the detection threshold, excluding the signal from further processing and proceeding with a contention process among a subset of stations.

5. The method of claim 1, further comprising, if a signal strength value of a signal received after selecting the detection threshold is in excess of the detection threshold, suspending a contention process among a subset of stations.

6. The method of claim 1, further comprising, for each station coupled to the shared communication medium, maintaining signal strength information.

7. The method of claim 6, in which the signal strength information is maintained at each of the stations coupled to the shared communication medium.

8. The method of claim 1, in which determining a signal strength value for a given signal includes determining an automatic gain control setting used for detecting the given signal.

9. The method of claim 1, in which determining a signal strength value for a given signal includes determining at least one of a correlation between different portions of the given signal and a correlation between a portion of the given signal and a stored symbol.

10. The method of claim 1, further comprising:
for each of the received signals, identifying a frame control portion of the signal, and
using the frame control portion to determine whether a signal is excluded from a contention process among a subset of stations.

11. The method of claim 1, further comprising, storing at each station coupled to the shared communication medium information from signals received at a given station and not addressed to the given station.

12. The method of claim 11, in which the stored information includes at least one of a source address, network identification information, and information used to demodulate a payload.

13. The method of claim 1, further comprising, in response to detecting that the received signals are from stations that belong to different networks, selecting the detection threshold such that, in response to the received signals having a signal strength in excess of the detection threshold, the received signals are processed according to the protocol of a subset of the stations.

14. The method of claim 1, further comprising selecting the detection threshold based on information in the received signals regarding destination stations to which the received signals are addressed.

15. The method of claim 1, in which a subset of the stations includes an authorized network of stations.

16. The method of claim 15, in which the received signals from networks other than the authorized network are rejected.

17. The method of claim 1, further comprising:
disabling communication among the first plurality of the stations through the shared communication medium, during a time when there are communications between a station in the first plurality of the stations and a station in the second plurality of the stations through the shared communication medium.

18. A method of communicating among stations coupled to a communication medium, comprising:
receiving signals from a first plurality of the stations in a first network through the communication medium that is shared with a second plurality of the stations in a second network;
determining signal strength values for each of the received signals based on at least a portion of a detected preamble of the received signals, wherein the detected preamble is received at a higher signal strength than a remaining portion of the received signals;
based on the signal strength values, selecting a detection threshold such that, in response to a signal having a signal strength in excess of the detection threshold, the signal is processed according to a protocol of the first plurality of the stations; and
sending a pending transmission from a first station of the first plurality of the stations in a first network to a first destination station of the first plurality of the stations based on a determination by the first station whether a second destination station of the second plurality of the stations of an ongoing transmission is affected by the pending transmission.

19. The method of claim 18, in which sending the pending transmission from the first station to the first destination station is also based on whether the first destination station of the pending transmission is affected by the ongoing transmission.

20. The method of claim 18, in which the ongoing transmission includes a transmission from a second station within a second network to a second destination station.

21. The method of claim 18, further comprising sending the pending transmission from the first station to the first destination station if the second destination station of the ongoing transmission is not affected by the pending transmission.

22. The method of claim 18, further comprising sending the pending transmission from the first station to the first destination station if the first destination station of the pending transmission is not affected by the ongoing transmission.

23. The method of claim 18, further comprising updating transmission mechanism parameters based on at least one of whether the first destination station is affected by the ongoing transmission, and whether the second destination station is affected by the pending transmission.

24. The method of claim 18, wherein the determination includes determining whether the second destination station of the ongoing transmission will be affected by the pending transmission based on signal information stored at the first station.

25. The method of claim 18, wherein the determination includes determining whether the first destination station of the pending transmission will be affected by the ongoing transmission based on signal information stored at the first station.

26. The method of claim 25, in which the signal information includes a table having, for each signal transmitted by the stations, at least one of source address, network ID, and preamble information.

27. The method of claim 25, further comprising exchanging the signal information stored at the first station with other stations coupled to the communication medium.

28. The method of claim 18, wherein selecting the detection threshold is such that, in response to the signal having the signal strength in excess of the detection threshold, the signal is not processed according to a protocol of the second plurality of the stations.

29. A communication system, comprising:
a shared communication medium; and
multiple stations coupled to the shared communication medium, each station configured to
receive signals from a first plurality of the stations in a first network through the shared communication medium that is shared with a second plurality of the stations in a second network,
determine signal strength values for each of the received signals from the first plurality of the stations in the first network based on at least a portion of a detected preamble of a received signal, wherein the detected preamble is received at a higher signal strength than a remaining portion of the received signal, receive an indicator of signal strength values determined for received signals among the second plurality of the stations in the second network; and based on the signal strength values for each of the received signals from the first plurality of the stations in the first network and based on the indicator of the signal strength values determined for the received signals among the second plurality of the stations in the second network, select a detection threshold such that, in response to a signal having a signal strength in excess of the detection threshold, the signal is processed according to a protocol of the first plurality of the stations and is not processed according to a protocol of the second plurality of the stations.

\* \* \* \* \*